Feb. 5, 1963 J. E. CASTIGLIA 3,076,364
RE-SURFACING TOOL
Filed June 20, 1958 2 Sheets-Sheet 1

INVENTOR.
John E. Castiglia
ATTORNEYS

Feb. 5, 1963  J. E. CASTIGLIA  3,076,364
RE-SURFACING TOOL
Filed June 20, 1958  2 Sheets-Sheet 2

INVENTOR
John E. Castiglia
BY
ATTORNEYS

United States Patent Office 3,076,364
Patented Feb. 5, 1963

3,076,364
RE-SURFACING TOOL
John E. Castiglia, Plainview, N.Y. (% Wheel Aligning Necessities Inc., 54 Brooklyn Ave., Westbury, Long Island, N.Y.)
Filed June 20, 1958, Ser. No. 743,428
3 Claims. (Cl. 82—4)

This invention relates generally to a method and apparatus for resurfacing wheel hub flanges and more particularly wheel hub flanges requiring a smooth outer surface so that gauges may be mounted thereon.

It is important in the use of certain wheel alignment gauges, such as disclosed in Patent No. Re. 24,186, issued July 24, 1956, to Biagis Castiglia, that the surface to which the gauge is attached be smooth and free of scratches and burrs. It is known that the only surface of a wheel hub which is machined and from which an accurate reading may be taken to determine wheel alignment, is the outer machined face surface of the wheel hub flange. Through use, this surface may become scratched and burred so in order that a gauge may be securely and accurately attached thereto, either by magnetic means or pin means such as disclosed in the aforementioned patent, it may become necessary to resurface the face to its original smooth condition.

Broadly, I have devised a method and apparatus for resurfacing wheel hub flange faces which comprises generally bringing a resurfacing tool into engagement with the wheel hub flange face and holding the tool stationary with respect to the spindle about which the wheel hub is rotatably mounted. When the wheel is rotated about the spindle with the resurfacing tool held stationary with respect to the spindle, the tool will then cut into the wheel hub flange face to completely resurface it.

The tool comprises generally a U-shaped member, the arms of which are movable towards each other to engage and clamp on to the sides of a spindle nut which holds the wheel on to the spindle. Means are provided to force the arms of the U-shaped member against the sides of the spindle nut in order to securely lock it thereon. A cutting blade is movably mounted on one of the arms of the U-shaped member and may be moved to bring it into engagement with the hub flange face. In addition, locking means are provided to lock the blade into place once it is brought into cutting position.

Referring to the drawings in which several embodiments of my invention are shown:

Figure 1:
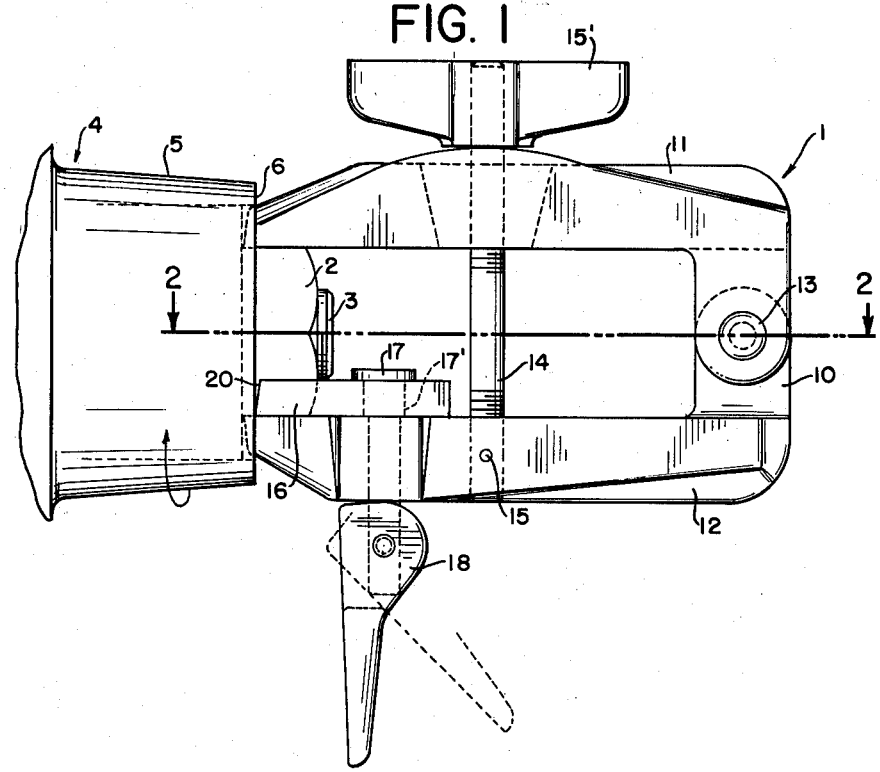
FIG. 1 is a side view of a resurfacing tool constructed according to my invention shown attached to a spindle nut.
Figure 2:
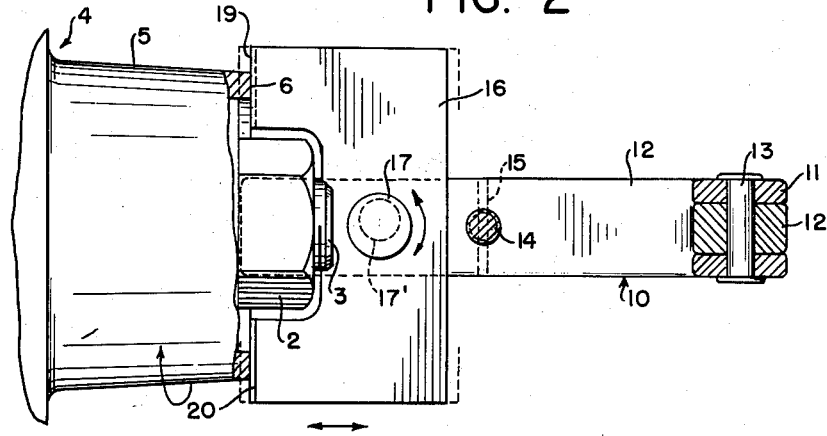
FIG. 2 is a sectional view of FIG. 1 taken along lines 2—2.

Referring in detail to FIG. 1, 1 denotes generally a resurfacing tool constructed according to my invention shown attached to a spindle nut 2 which is secured on to a spindle 3 and about which a wheel denoted generally by 4 is rotatable. Wheel 4 has thereon a hub flange 5 having a machined face 6 which after a period of time may become scratched and burred. In order that this surface may have a gauge, securely and accurately attached thereon, it often becomes necessary to resurface it.

The tool 1 by which I propose to resurface face 6, comprises a U-shaped clamp 10 having separate arms 11 and 12 which are rotatable about pin 13. The open ends of arms 11 and 12 engage the sides of spindle nut 2 and are held firmly thereon by means of a threaded bolt 14 held on to arm 12 by pin 15 and nut 15'. It is seen that when nut 15' is screwed down on to arm 11, that it will bring the ends of arms 11 and 12 into firm clamping contact with spindle nut 2.

A cutting blade 16 is mounted on arm 12 by means of a pin 17 having a cam lock 18 on one end. Pin 17 has a portion 17' eccentric with respect to the center line of the pin and in rotatable engagement with the cutting blade 16. Thus when pin 17 and eccentric portion 17' are rotated, blade 16 will be moved towards or away from the face 6. Movement of cam lock 18 to the dotted position shown in FIG. 1 will pull pin 17 downwards, thus locking blade 16 into place. Cutting blade 16 has thereon cutting surfaces 19 and 20 which are oppositely disposed to each other.

The resurfacing tool is moved in the following manner. The arms 11 and 12 are initially brought into engagement with the sides of spindle nut 2, and then nut 15' is screwed down on bolt 14 in order to clamp the arms 11 and 12 securely to the spindle nut. Pin 17 is then rotated in order to bring both sides of the cutting blade into contact with the face 6 which is desired to be resurfaced. After this has been done, cam lock 18 is depressed in order to lock the cutting blade securely into place. The wheel hub flange is then rotated by rotating the wheel in the direction indicated in the drawings so that the complete face 6 of the wheel hub flange is brought into cutting engagement with edges 19 and 20. It is thus seen that when the wheel is completely rotated, that the complete hub face 6 will have been resurfaced.

After the wheel hub face has been completely resurfaced, it is then suitable for having a wheel gauge mounted directly thereon in order to accurately determine camber, caster and kingpin inclination, toe and steering geometry.

Figure 3:
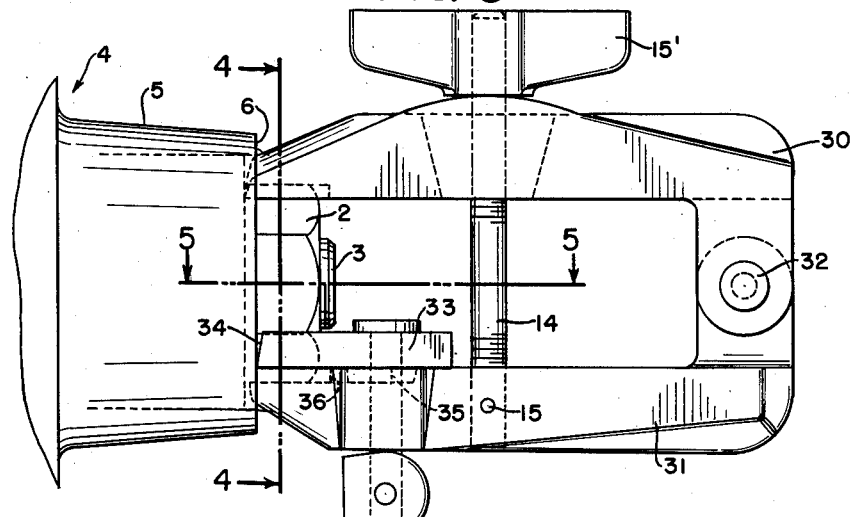
FIG. 3 is a side view of a slightly different form of tool than that shown in FIG. 1.
Figure 4:
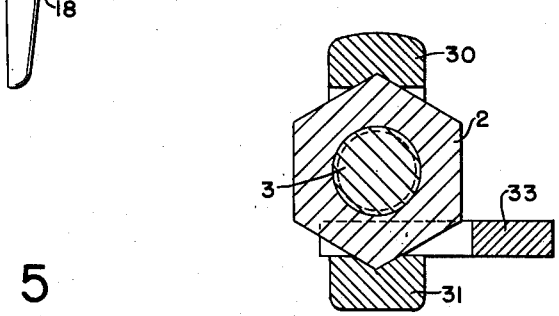
FIG. 4 is a cross-sectional view of FIG. 3 taken along line 4—4.
Figure 5:
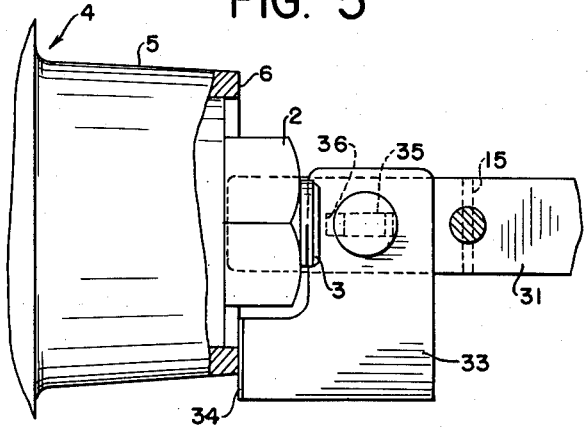
FIG. 5 is a partial plan view of FIG. 4.

Referring to FIGS. 3–5 in which a slightly different embodiment of my novel resurfacing tool is illustrated, 30 denotes an upper arm and 31 a lower arm pivoted about a pin 32. Arms 30 and 31 are brought towards each other to securely clasp the spindle nut 2 by means of nut 15' and pin 15 in the same manner as with the tool shown in FIG. 1.

A cutting blade 33 differs from that shown in FIG. 1 in that it has only one cutting edge 34. In order to insure that the cutting edge 34 will be in proper alignment when the blade is brought into contact with the face 6, arms 30 and 31 are cut at their ends, as shown in FIG. 4 to engage corner of the spindle nut 2. When nut 15' is screwed down, the ends of the arms will securely hold the nut 2 and will align themselves parallel to the corners of the nut and thus perpendicular to the face 6.

Blade 33 has a projection 35 which extends into a slot 36 in arm 31 as shown in FIG. 5. A locking cam 18 and pin 37 are provided to lock the blade 33 into place after it has been brought into contact with the face 6.

In this form of the invention the blade is not rotatable about pin 37 nor is pin 37 mounted eccentrically with respect to the blade. The blade is brought into contact with the face by moving it in the slot or track 36 by hand so that the eccentric arrangement of pin 17 and blade 16 of FIG. 1 is not necessary.

After the blade 33 has been brought into contact with face 6 and locked into place by cam 18, the wheel 4 is rotated 360° thus bringing the complete face 6 into cutting engagement with the edge 34.

While I have disclosed cutting edges only on a cutting blade, it is obvious that any truing surface which could be held stationary with respect to the spindle, while at the same time being in engagement with the face to be trued, such as a stone, would suffice to resurface the wheel hub flange face.

I do not limit this invention to the details of construction and arrangement shown to illustrate the same, except

I claim:

1. A resurfacing tool for resurfacing the machined face of a wheel hub flange rotatably held to a spindle, comprising a resurfacing element, supporting means attachable to said spindle for holding said resurfacing element stationary with respect to said spindle and in engagement with said machined face so that when said wheel hub flange is rotated about said spindle, said machined face is resurfaced by said resurfacing element.

2. A resurfacing tool according to claim 1 wherein said resurfacing element comprises a cutting blade having at least one cutting edge.

3. A resurfacing tool for resurfacing the machined face of a wheel hub flange of a wheel rotatably held to a spindle by a spindle nut, comprising two L-shaped arms joined together at their ends to form a U-shaped clamp, said arms being movable towards each other and adapted to engage the sides of said spindle nut, clamping means for clamping said arms on said nut, a cutting blade movably mounted on one of said arms and locking means for locking said cutting blade against movement so that when said wheel is rotated about said spindle, said machined face will be resurfaced by said cutting blade.

References Cited in the file of this patent

UNITED STATES PATENTS

| | | |
|---|---|---|
| 163,797 | Nelson | May 25, 1875 |
| 222,820 | Goodell | Dec. 23, 1879 |
| 353,485 | Donnally | Nov. 30, 1886 |
| 963,559 | Hines | July 5, 1910 |
| 1,513,350 | Stolle | Oct. 28, 1924 |
| 1,715,825 | Duffy | June 4, 1929 |
| 2,157,375 | Wiessner | May 9, 1939 |
| 2,325,969 | Morris | Aug. 3, 1943 |
| 2,409,158 | Simpson | Oct. 8, 1946 |
| 2,431,654 | White | Nov. 25, 1947 |
| 2,554,283 | Wagstaff | May 22, 1951 |